Figure 1:
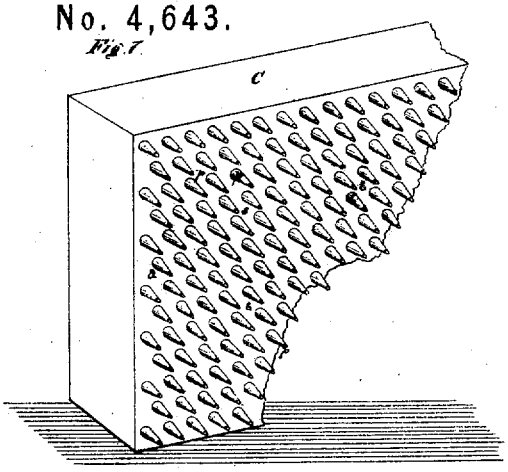

SAMUEL F. GOLD & WILLIAM A. FOSKETT.

Improvement in Steam Heaters.

No. 4,643. Reissued Nov. 21, 1871.

Witnesses: Arnold Hoermann
William A. Donald

Samuel F. Gold
Wm A. Foskett,
By Thos S. How
Atty

AM. PHOTO-LITHOGRAPHIC CO. N.Y. (OSBORNE'S PROCESS.)

UNITED STATES PATENT OFFICE.

SAMUEL F. GOLD, OF ENGLEWOOD, NEW JERSEY, AND WILLIAM A. FOSKETT, OF NEW HAVEN, CONNECTICUT, ASSIGNORS, BY MESNE ASSIGNMENTS, TO THE UNION STEAM AND WATER HEATING COMPANY.

IMPROVEMENT IN STEAM-HEATING APPARATUS.

Specification forming part of Letters Patent No. 36,000, dated July 29, 1862; reissue No. 4,643, dated November 21, 1871.

*To all whom it may concern:*

Be it known that we, SAMUEL F. GOLD, formerly of Brooklyn, in the county of Kings and State of New York, now of Englewood, in the county of Bergen and State of New Jersey, and WILLIAM A. FOSKETT, formerly of Meriden, in the county of New Haven and State of Connecticut, now of New Haven, in the county of New Haven and State of Connecticut, have invented certain Improvements in Steam-Heating Apparatus, of which the following is a specification:

This invention relates to apparatus for warming and ventilating buildings by means of a current of air passing in contact with surfaces heated by steam; and has for its object the economization of the metal used in the production of such heating-surfaces, the effective transmission of the heat from the heating-surfaces, and the proper and efficient distribution of the steam through the heaters, as hereinafter more fully set forth. Said invention consists in—First, providing a steam-chamber or chambers for radiating heat with projections so constructed and arranged as to wholly or partially divide or split up the said current of air into laminæ or stratums, as hereinafter more fully set forth. Second, providing the external surface or surfaces of a steam-chamber or chambers for radiating heat with projections so constructed and arranged thereupon as to deflect the passing air against each other or against other heating-surface or surfaces, by which the air is more perfectly heated, as hereinafter more fully set forth. Third, connecting two or more steam-chambers or radiators by a central opening extending directly through both or all, and also opening into the side passages, substantially as herein set forth. Fourth, providing a steam-radiator for a horizontal diaphragm partially separating its upper and lower portions, so as to facilitate the circulation of the steam through it, substantially as hereinafter more fully set forth. Fifth, the arrangement, contiguous to each other, of two or more of the radiating steam-chambers having projections upon them to deflect the air in such a manner that the projections upon one of these chambers shall deflect the passing current of air against the projections on the contiguous chamber, as hereinafter more fully set forth. Sixth, the arrangement, contiguous to each other, of two or more radiating steam-chambers having projections upon them, to divide or partially divide the air, in such a manner that the projections upon one of these chambers shall co-operate with the projections on the contiguous chamber in dividing or partially dividing the passing current of air, as hereinafter more fully set forth.

Figure 4:
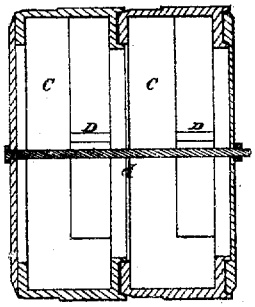
Figure 2:
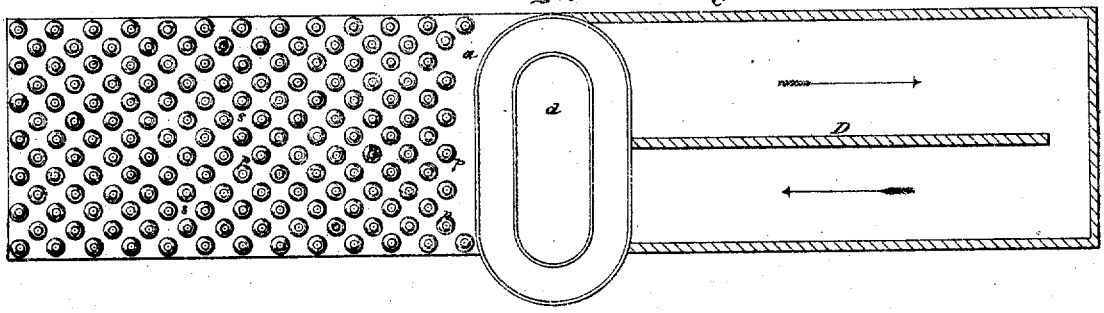
Figure 3:
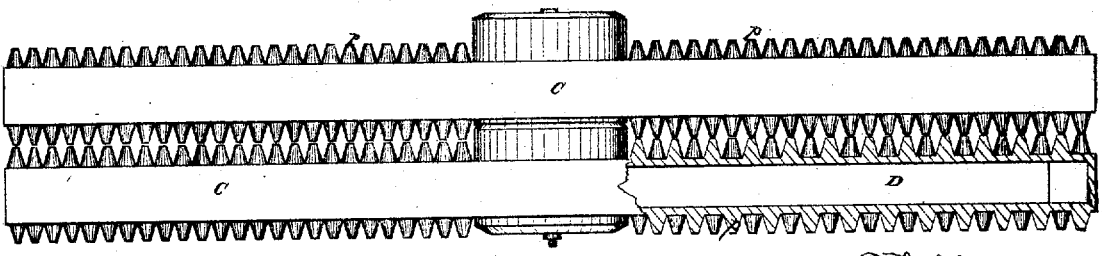

Figure 1 is a perspective view of a part of one of the radiators, or, in other words, of one of the sections of the steam-chamber, showing the manner in which it is preferred to make the radiating-surfaces. Fig. 2 is a side elevation of one of the radiators, partly in section, and showing, at the right-hand end of the figure, the diaphragm above mentioned. Fig. 3 is a top view of two of the radiators or sectional chambers united, one of said sections or radiators being shown partly in section. Fig. 4 is a transverse section of the same taken through the joint.

In order that the said invention may be fully understood and its importance appreciated, it may be proper to state briefly the disadvantages previously existing in artificial warming apparatus, which it is the object of this invention to obviate.

It is well known that the great objection to artificial warming apparatus, whether hot-air furnaces or pressure hot-water apparatus, as ordinarily constructed previously to the introduction of the present invention, arises from the fact that the contact of the atmosphere with the highly-heated surfaces employed in such heaters vitiated the air and rendered it unwholesome for respiration. These bad effects of artificial warming diminish in proportion as the temperature of the transmitting surface is reduced, thus rendering the mode of warming and ventilating herein described less prejudicial to health than any other system of warming now in use, the open fire-place, perhaps, excepted. But when it is considered that in order to obtain the lowest degree of steam heat the temperature of the steam-chamber or radiator must at least be raised to the degree necessary for the generation of steam, or 212° Fahrenheit, and that, owing to the conducting properties of the metal composing these chambers, the steam-chambers or radiators of this character of apparatus, as generally constructed, have their outer surface heated to very nearly the same degree as the inner, or to a degree sufficient to decompose the moisture of all air coming in contact with them, it will be readily perceived that air passing over so highly-heated plates must be necessarily injured for the purpose of respiration. This being the case, it becomes necessary, in order to avoid this objection, to so construct the steam-chamber that the radiation from its plates into the atmosphere used for warming shall be so rapid and perfect that the external surface of these plates shall be kept at a sufficiently low temperature to avoid the injurious overheating of any portion of the incoming atmosphere which may come in contact with them.

From the foregoing considerations it will be perceived that to make the current of heated air wholesome it is necessary that the heat of the external surfaces of the radiators shall be so reduced as to avoid injury to the atmosphere used for heating, and at the same time it is also necessary to efficiency of operation that this shall be so accomplished as not to impair the rapid transmission of heat from the steam to the atmosphere, and that the air used for heating shall be itself uniformly heated through all its particles. It is also important that this result shall be accomplished with the minimum expenditure of metal; otherwise the apparatus used, to be efficient in its operation, will necessarily be cumbersome and expensive.

It is, therefore, the object of this part of this invention to so construct the apparatus that the air passing over the surfaces of the radiators to be heated shall keep these surfaces down to a degree of heat sufficiently moderate that the said plates shall produce no materially pernicious effect upon this air, and at the same time so that the air shall be uniformly heated, and also in such a manner that these results shall be accomplished with the minimum weight of metal and cost of construction.

The laws governing the transmission of heat show that air is heated by contact with heated substances, and also very slightly by its conducting power; but this conducting power is so very slight that in the rapid passage of air over heated plates there is not time in the moment of its passage for the heat to become imparted by conduction with efficiency to any very considerable depth into the stratum of air, and unless the stratum is made very thin it is easy to see that at the moment of passage the film of air next the plates will be overheated, while that further from them will remain nearly or quite cold. In order, therefore, that the current of air may receive a uniform and efficient amount of heat, it is necessary that while passing the steam-chambers it shall be divided into very thin stratums, each stratum of which shall come in contact with a heated surface. To effect this result the heating portion of the apparatus is constructed of a series of thin steam-chambers, C C, placed upon their edges, and united throughout by the single joint surrounding the steam-openings. The sides of these chambers are provided with projections on their outer surfaces, which deflect the current of air from one part of the heating-surface to another, and thus cause a more rapid and uniform transmission of the heat. They are also so constructed as to divide the current of air into thin stratums, in consequence of which the heat is imparted to the air mostly by direct contact with the heating-surfaces.

Various forms of construction may be adopted to this end, and such different forms may more or less completely carry out and embody the principles of this invention; but the form herein described is preferred. In this form of construction the flat surfaces *a* of these chambers are studded with conical projections *p*, arranged in rows in such a manner that the projections of one row shall be directly above the spaces *s*, between the projections of the row beneath, the spaces being about as broad as the diameters of the bases of the projections, the length of the projections being such that when the chambers C are united, to form the entire steam-chamber, the projections of the adjacent chambers C will be nearly in contact, as shown in Fig. 3. The effect of this construction is to divide up the current of air as it passes between the sectional steam-chambers into very minute subdivisions, so as to bring nearly all the particles of said air in direct contact with some portions of the heating-surface during its transit, and thereby heat it throughout by contact. The full extent of these subdivisions of air will be best understood and appreciated from the following statement in detail of the mode of construction which we have preferred in carrying out our invention, and which we herein describe: The sectional chambers C are six inches high and have thirteen horizontal rows of projections, which projections have an average diameter of three-eighths of an inch, with spaces of the same breadth between them. It will be apparent that by this construction the current of air will be divided and successively subdivided till nearly every particle of it must necessarily come in contact with some of these heating-surfaces; and this subdivision is found by experiment to give the maximum effect attainable from the pressure of steam of half a pound to the square inch, which is the pressure preferred.

The dimensions above given are simply illustrations of the general principle involved in the said invention, and will, of course, be varied according to circumstances, the end attained being that the heat imparted from the steam-chambers to the current of heating-air is reduced to a healthful temperature partly by deflection of the air from one part of the heating-surface to another and partly by the division and repeated subdivision of the current, and, at the same time, this is accomplished with a very limited expenditure of metal in the construction of the steam-chambers. The sectional chambers C are constructed with central openings *d* in their opposite faces for the admission of the steam, the central portion of the chamber, where this opening is made, being slightly broader horizontally than the other portions, so as to furnish the means of uniting two or more of these sections by securing them together, with the surfaces surrounding the central openings in contact, so that the entire steam-chamber, made up of any number of sections, will be centrally connected throughout its whole extent, thus making the steam-chamber to consist of a central passage and lateral wings extending therefrom. Each wing has a horizontal diaphragm, D, extending from the central opening nearly to the extremity of the wing, as shown in Fig. 2, for the purpose of insuring a prompt circulation of steam through the chamber, which purpose it accomplishes by causing the steam to pass outwardly toward the extremity of the wing through the upper channel thus formed, and thence back to the center through the lower channel.

By this construction of the chamber the opposite wings of each section are heated progressively and nearly equally from the middle toward the extremities in such a manner that the expansion on both sides of the connection will be equal. The same will be true concerning the contraction in cooling; consequently, the joint will receive no injury from the variations of temperature to which the apparatus is exposed—a result due alone to the central connection of the sections and the reception of the steam through these central connections. Furthermore, this construction insures the successful passage of the steam into and through the apparatus in extremely cold weather without danger of the freezing of the water of condensation, which difficulty is apt to occur in other constructions. In this construction the steam is kept at a uniform pressure throughout the apparatus; and when the steam is first let on in extremely cold weather, when there is a liability to frost in the sectional chambers, the steam enters at the center of the first section, passes laterally through the upper branches of both wings, its radiation destroying the frost in advance, while its force expels the air from the chamber in consequence of the steam following the direction of the arrows in Fig. 2. While this is taking place in the first section reached by the steam, a portion of the steam passes further on in the central opening to the next section, and so on through the entire series, the steam entering and warming each of the sections which make up the entire steam-chamber in the same manner, so that, in consequence of this progressive action there can be no danger of the water of condensation freezing when the steam is let into the chamber in the coldest weather, even though the steam is at the very low pressure above mentioned.

In this respect, also, this sectional construction of the steam-chamber with the central connection is of great advantage and a valuable portion of this invention, especially so when it is considered that it avoids the necessity of a stop-valve to accumulate a pressure of steam in the boiler to force the steam from the boiler into the steam-chambers, and, as a consequence, escapes the dangers attendant upon the use of such a valve.

After the circulation of the steam through the steam-chamber is once established the steam passes with considerable directness to all parts of it, so as to heat all parts of these sectional chambers or radiators nearly alike, instead of passing entirely through the chamber first arrived at and being materially cooled by radiation before passing to the other sections.

The joints between the sections may be made tight by the interposition of any suitable packing in the manner in which steam-joints are ordinarily packed.

The central opening at the end of the series of sections C must, of course, be closed to prevent the escape of steam, which may be done by a plate of metal, as represented in Fig. 4; and the sections should be firmly secured together by means of one or more bolts passing through such closing-plate and through a plate or stay across the opening at the opposite end of the series, as shown in the figure last named; or any other means may be employed that will answer the purpose.

We claim as our invention—

1. A steam-chamber, C, for radiating heat, studded with a series of projections, *p*, extending from its outer surface at intervals from each other along the side of said chamber or radiator to divide or partially divide the current of air, substantially as hereinbefore set forth.

2. The steam-chamber C for radiating heat, studded with projections *p*, arranged alternately, substantially as hereinbefore set forth.

3. The steam-chamber C for radiating heat, studded with projections *p*, having vertically-inclined surfaces, substantially as set forth.

4. Two or more steam-chambers or radiators, C, connected by a central opening, *d*, extending through two or more of said chambers, and also opening into the side passages, substantially as herein set forth.

5. The combination, with a steam-chamber, C, of a diaphragm, D, substantially as hereinbefore set forth.

6. The arrangement contiguous to each other of two or more steam-chambers or radiators, C, studded with projections *p*, having vertically-inclined surfaces, or arranged alternately, substantially as hereinbefore set forth.

7. The arrangement contiguous to each other of two or more steam-chambers or radiators, C, studded with projections *p* to divide the current of air, substantially as set forth.

SAMUEL F. GOLD.
WM. A. FOSKETT.

Witnesses:
WM. DONNELLY,
THOS. P. HOW.

(17)